Oct. 18, 1966 W. A. S. BARBOUR 3,280,178
PRODUCTION OF VINYL ACETATE
Filed Oct. 20, 1964
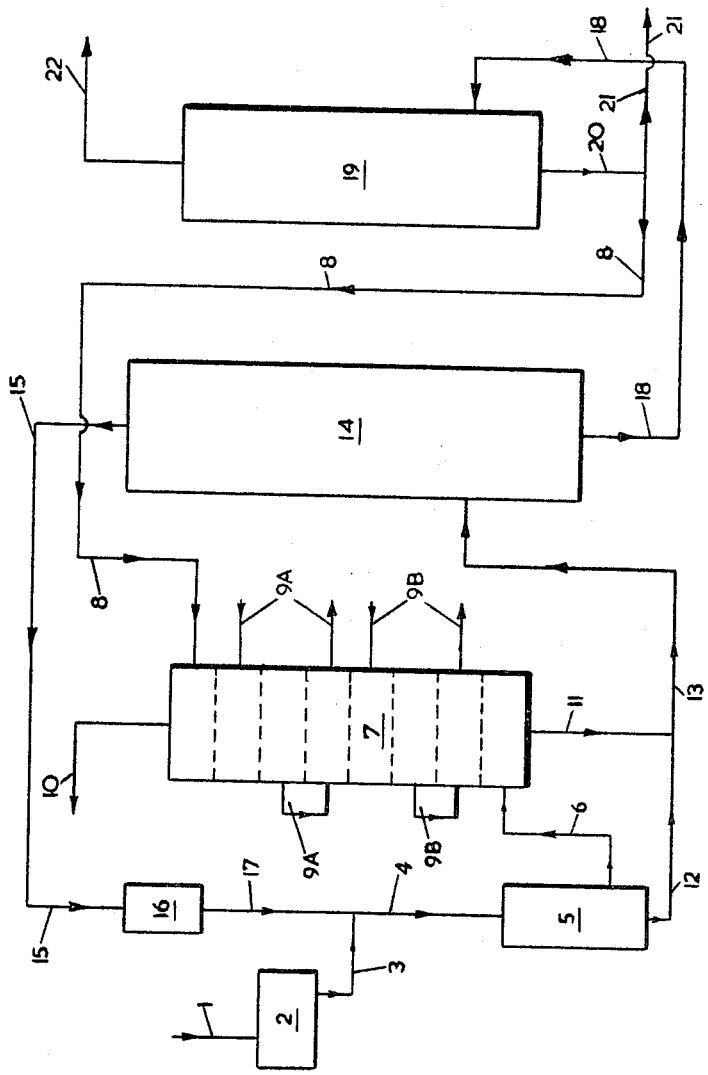
INVENTOR
WILLIAM ARTHUR SHUTE BARBOUR 3,280,178
PRODUCTION OF VINYL ACETATE
William Arthur Shute Barbour, Great Missenden, England, assignor to The Distillers Company Limited, Edinburgh, Scotland, a British company
Filed Oct. 20, 1964, Ser. No. 406,661
2 Claims. (Cl. 260—498)

This application is a continuation-in-part of my application Serial Number 140,305, filed September 25, 1961, now abandoned.

This invention relates to the recovery of vinyl acetate from the product of reaction of acetylene with acetic acid.

A typical continuous process for the production of vinyl acetate by reacting acetylene with acetic acid in the vapor phase consists in mixing acetylene gas with acetic acid vapor and passing the mixed vapors over a catalyst of zinc acetate impregnated on activated carbon and maintained at a temperature from 170° to 220° C. The reaction gases, in addition to vinyl acetate, acetylene and acetic acid, contain some acetaldehyde, acetic anhydride, acetone, ethylidene diacetate and trace quantities of divinylacetylene and crotonaldehyde. The acetylene and acetic acid vapor can be passed over the catalyst in equimolar quantities or with either reactant in excess, for example with an acetylene to acetic acid molar ratio of 4 to 1.

One way of treating the product stream from the reaction zone would be to cool it, whereby vinyl acetate, acetic acid and acetaldehyde would be condensed, and acetylene would remain uncondensed. Even using refrigeration to cool the product stream, the acetylene still contains substantial amounts of vinyl acetate and acetaldehyde. The liquid condensate is passed to a degassing tower where acetylene dissolved in the condensate is removed. This acetylene also contains substantial amounts of vinyl acetate and acetaldehyde. The uncondensed acetylene and the acetylene removed in the degassing tower are recycled to the reactor. Polymerisable materials such as vinyl acetate and acetaldehyde have an adverse effect on the life of the catalyst in the reactor.

A way of removing vinyl acetate and acetaldehyde from the recycled acetylene would be to wash it with acetic acid. Because acetic acid solidifies at temperatures below about 16° C. it would be necessary to employ large quantities of acetic acid for this purpose. This would result in a dilute mixture with large distillation costs.

It is an object of the present invention to reduce the amount of acetic acid required to wash the recycle acetylene.

Accordingly, the present invention provides, in a process for the production of vinyl acetate by reacting acetic acid with acetylene in the vapor phase in the presence of a catalyst in which acetylene is recovered from the reaction product and recycled to the reaction zone, the step of contacting the recycle acetylene with liquid acetic acid which is maintaind by applied cooling at a temperature of at most 30° C. The product stream is cooled in one or more condensers and/or heat-exchangers before treatment with acetic acid. Conveniently the product stream can be passed through a heat-exchanger which pre-heats the acetylene feed to the reactor; if desired the product stream can then be passed through a condenser cooled with water. Preferably the product stream is cooled to a temperature within the range 25° C. to 30° C. When the product stream is cooled thus, part of it condenses to form a liquid condensate. The liquid condensate consists of a mixture of vinyl acetate and acetic acid, together with acetaldehyde and other impurities. The uncondensed gaseous product stream, which can readily be separated from the liquid condensate, consists essentially of acetylene saturated with the vapors of vinyl acetate, acetaldehyde and acetic acid.

The uncondensed gaseous product stream is then contacted with acetic acid, preferably in countercurrent flow, to remove vinyl acetate vapour and acetaldehyde vapour from the acetylene. This operation can conveniently be carried out in an absorption column. Cooling is applied to the acetic acid in contact with the gaseous product stream in order to maintain the temperature at 30° C. or below.

In one embodiment of the invention the absorption column is a sieve plate column provided with intercoolers consisting of external tubular heat-exchangers. These heat-exchangers take liquid from several plates in the column and return the liquid after cooling to plates lower in the column. In order to facilitate flow under gravity through the intercoolers, the spacing between the plates connected thereby is greater than that between the other plates of the column.

The mixture of vinyl acetate and acetic acid obtained, either from the cooling stage or from the absorption stage, or preferably, from both, can be heated to remove any acetylene present. This can conveniently be carried out in a distillation column operated under total reflux, acetylene being removed overhead and a mixture of vinyl acetate and impure acetic acid remaining as base product.

The vinyl acetate is then separated from the impure acetic acid, for example by distillation. Conveniently the mixture can be subjected to fractional distillation so that the vinyl acetate together with the acetaldehyde is removed overhead and impure acetic acid remains as the base product. Some of the impure acetic acid can be recycled to the absorption stage to be contacted with more acetylene gas saturated with vinyl acetate and acetic acid vapors. The vinyl acetate recovered can then be further purified to separate the acetaldehyde and other impurities.

The advantages of the method of the present invention over refrigerated cooling of the product stream from the reactor are as follows:

(1) The initial capital cost of the equipment is reduced.
(2) The operating costs of the plant are reduced.
(3) The useful life of the catalyst is increased.
(4) Recycled acetylene is of greater purity.

For example in one comparative run the electricity required to refrigerate the product stream amounted to 76 kilowatt-hours per ton of vinyl acetate produced, whereas the electricity required to pump acetic acid to the absorber amounted to less than 1 kilowatt hour per ton. Also the production of vinyl acetate per unit quantity of catalyst was increased from 195 to 440. When the acetic acid was maintained by applied cooling at a temperature of 30° C. or less, the amount of acetic acid required to wash vinyl acetate and acetaldehyde from the recycle acetylene was reduced from a calculated 11,200 lbs. per ton of vinyl acetate produced to a practically-achieved 4,000 lbs./ton.

This resulted in a saving of energy required to separate vinyl acetate from acetic acid amounting to 1,200 lbs of steam per ton of vinyl acetate produced.

In one embodiment of the invention, shown diagrammatically in the accompanying drawing, the product stream the reactor (not shown) comprising acetylene and the vapors of vinyl acetate, acetic acid and acetaldehyde, is passed through line 1 to a heat-exchanger 2. The heat-exchanger 2 preheats the acetylene feed (not shown) to the reactor. The product stream is then passed through lines 3 and 4 to a water-cooled condenser 5. Acetylene saturates with the vapours of vinyl acetate, acetic acid and acetaldehyde passes from the condenser 5 at a temperature which may at times be as high as 45° C., although it is preferred to keep the temperature within the range 25–30° C., through line 6 to an absorption sieve-plate column 7, where the acetylene flows in countercurrent to a stream of liquid acetic acid introduced by line 8. The column 7 is provided with separate external intercoolers, of which two only 9A, 9B are shown. In the absorption column 7 vinyl acetate and acetaldehyde are removed from the acetylene. Acetylene leaves the head of the column 7 through line 10 and is recycled to the reactor. A mixture of vinyl acetate and acetaldehyde with acetic acid is removed from the base of column 7 through line 11. This mixture is mixed with the condensate leaving condenser 5 by line 12. The combined liquid mixture of vinyl acetate, acetaldehyde and acetic acid is passed through line 13 to a packed column 14, which is operated under total liquid reflux. Acetylene is removed overhead from column 14 through line 15 and thence is passed back through line 17 to mix with incoming heat-exchanged reaction product in line 4. A liquid mixture of vinyl acetate, acetic acid and acetaldehyde, free from acetylene is removed from the base of column 14 through line 18. This mixture is distilled in column 19 to separate vinyl acetate as the overhead product. The vinyl acetate removed from column 19 by line 22 contains acetaldehyde from which it can be separated by fractional distillation, after which it may, if desired, be subjected to further purification. Liquid impure acetic acid leaving the base of column 19 through line 20 is divided into two streams, one stream being withdrawn through line 21 for purification and the other stream being recycled through line 8 to the absorption column 7. Mass flow-rates through lines 6 and 10 are set forth in Table I.

TABLE I

| Substance | Mass flow in lbs./hr. | |
|---|---|---|
| | Line 6 | Line 10 |
| Acetylene | 5,610 | 5,610 |
| Acetic acid | 107 | 165 |
| Vinyl acetate | 1,310 | 4 |
| Acetaldehyde | 36 | 5 |

When brine condensers were used in place of the absorption column 7, the corresponding mass flow-rates were as set forth in Table II.

TABLE II

| Substance | Mass flow-rate in lbs./hr. | |
|---|---|---|
| | Line 6 | Line 10 |
| Acetylene | 5,610 | 5,610 |
| Acetic acid | 107 | 7 |
| Vinyl acetate | 1,310 | 95 |
| Acetaldehyde | 36 | 15 |

I claim:
1. In a process for the recovery of vinyl acetate from the vapor phase reaction product of acetylene with acetic acid which reaction product contains vinyl acetate, acetic acid and acetylene by cooling the mixture a vapors to a temperature within the range 25° to 30° C. to separate acetylene saturated with vinyl acetate vapor and acetic acid vapor from a mixture of vinyl acetate and acetic acid, contacting the acetylene so saturated with liquid acetic acid to remove vinyl acetate and acetic acid from the acetylene, heating the mixture of vinyl acetate and acetic so obtained to remove any acetylene remaining in solution and separating the vinyl acetate from the acetic acid, the improvement which comprises contacting the acetylene separated from the cooled reaction product with acetic acid by countercurent absorption while cooling the acetic acid employed in the countercurrent absorption to remove latent heat evolved from the condensing vinyl acetate.

2. In a process for the production of vinyl acetate by reacting acetic acid with acetylene in the vapor phase in the presence of a catalyst, in which acetylene is recovered from the reaction product and recycled to the reaction zone, the improvement of contacting the recycle acetylene at a temperature not exceeding 30° C. with liquid acetic acid which is maintained at that temperature by applied cooling.

References Cited by the Examiner
UNITED STATES PATENTS
2,794,827   6/1957   Stanton _____ 260—498
3,172,733   3/1965   Karnofsky _____ 260—498

LORRAINE A. WEINBERGER, *Primary Examiner.*

D. P. CLARKE, S. B. WILLIAMS, *Assistant Examiners.*